(12) United States Patent
Park

(10) Patent No.: US 6,505,808 B1
(45) Date of Patent: Jan. 14, 2003

(54) APPARATUS FOR MOUNTING ENGINE FOR AUTOMOBILES

(75) Inventor: Hee-Beom Park, Pusan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/628,163

(22) Filed: Jul. 28, 2000

(30) Foreign Application Priority Data

Dec. 16, 1999 (KR) ............................................ 99-58236

(51) Int. Cl.$^7$ ................................................. F16M 13/00
(52) U.S. Cl. ....................................................... 248/674
(58) Field of Search ................... 248/674, 300, 248/638

(56) References Cited

U.S. PATENT DOCUMENTS

| 4,899,703 | A | * | 2/1990 | Buferne | 248/674 |
| 5,312,080 | A | * | 5/1994 | Mazur | 248/674 |
| 6,230,585 | B1 | * | 5/2001 | Bator | 248/674 |
| 6,260,814 | B1 | * | 7/2001 | Mathews | 248/674 |

* cited by examiner

Primary Examiner—Alvin Chin-Shue
(74) Attorney, Agent, or Firm—Christie, Parker & Hale, LLP

(57) ABSTRACT

The object of the present invention is to provide an apparatus for mounting an engine for automobiles with an engine mount fixed to the top surface of an inner part of a front side member. This engine mounting apparatus has a reinforcing bracket set within the inner part of the front side member while being welded to the interior surface of the inner part. In addition, a pipe nut is firmly and vertically set in the reinforcing bracket and engages with a locking bolt, which mounts a hydro-mounting cup of the engine mount to the top surface of the inner part of the front side member. In this apparatus, the vibration impact from the engine is applied to the sidewall of the pipe nut. The engine mounting apparatus of this invention is thus improved in its structural strength and in its vibration intercepting effect, and so it effectively reduces vibration noise of the engine during operation of the engine.

9 Claims, 3 Drawing Sheets

APPARATUS FOR MOUNTING ENGINE FOR AUTOMOBILES

BACKGROUND OF THE INVENTION

1. Field of the Invention

The present invention relates, in general, to an apparatus for mounting an engine for automobiles and, more particularly, to an apparatus for mounting an engine for automobiles with an engine mount fixed to the top surface of an inner part of a front side member.

2. Description of the Prior Art

As well known to those skilled in the art, an engine of an automobile is a source of vibration noise of the automobile during operation of the engine. Particularly, the vibration impact from the engine during operation is directly applied to the engine mount. Some conventional engine mounts are provided with a rubber shock absorber for absorbing impact applied from an engine to the engine mount during a power stroke of the engine. Such conventional engine mounts are so-called "rubber mounts."

Nowadays, hydro-mounts for engines have been proposed for use in place of such rubber mounts. FIGS. 1 and 2 show the lower portion of a conventional hydro-mount for engines.

As shown in the drawings, the conventional hydro-mount for engines comprises an outer part 14 of a front side member mounted to the inside edge of a fender apron front panel 12, and an inner part 16 of the front side member mounted to the outer part 14.

A reinforcing bracket 18 is set within the inner part 16 of the front side member while being welded to the interior surface of the part 16. A hydro-mounting cup 20 is mounted to the top surface of the inner part 16 using a first locking means 22 consisting of nuts and bolts. In such a case, the locking means 22 integrates the mounting cup 20, the inner part 16 of the front side member and the reinforcing bracket 18 into an assembly. The upper portion of the hydro-mount is locked to the fender apron front panel 12 using a second locking means 24.

As shown in FIG. 3, the reinforcing bracket 18 is an angled member having an L-shaped cross-section, with two boltholes 26 being formed on the bracket 18 and receiving two bolts of the locking means 22.

However, such a conventional hydro-mount has the following structural defect. That is, the vibration impact from an engine during operation is less likely to be applied to the second locking means 24, which mounts the upper portion of the hydro-mount to the fender apron front panel 12. However, most of the vibration impact is applied to the first locking means 22, which mounts the hydro-mounting cup 20 to the top surface of the inner part 16. Therefore, the conventional hydro-mount is undesirably reduced in its structural strength.

SUMMARY OF THE INVENTION

Accordingly, the present invention has been made keeping in mind the above problems occurring in the prior art, and an object of the present invention is to provide an apparatus for mounting an engine for automobiles, which improves the structural strength of the engine mount, thus accomplishing a desired vibration intercepting effect of the engine mount and reducing vibration noise of the engine during operation of the engine.

In order to accomplish the above object, the present invention provides an apparatus for mounting an engine for automobiles with an engine mount fixed to the top surface of an inner part of a front side member, comprising a reinforcing bracket set within the inner part of the front side member while being welded to the interior surface of the inner part. In addition, a pipe nut is firmly and vertically set in the reinforcing bracket and engages with a locking bolt, which mounts a hydro-mounting cup of the engine mount to the top surface of the inner part of the front side member.

In the above apparatus, the reinforcing bracket is vertically concaved at a desired portion, thus forming a vertical concaved part having a subcylindrical surface, while the pipe nut is set in the concaved part while being welded to the subcylindrical surface of the concaved part.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
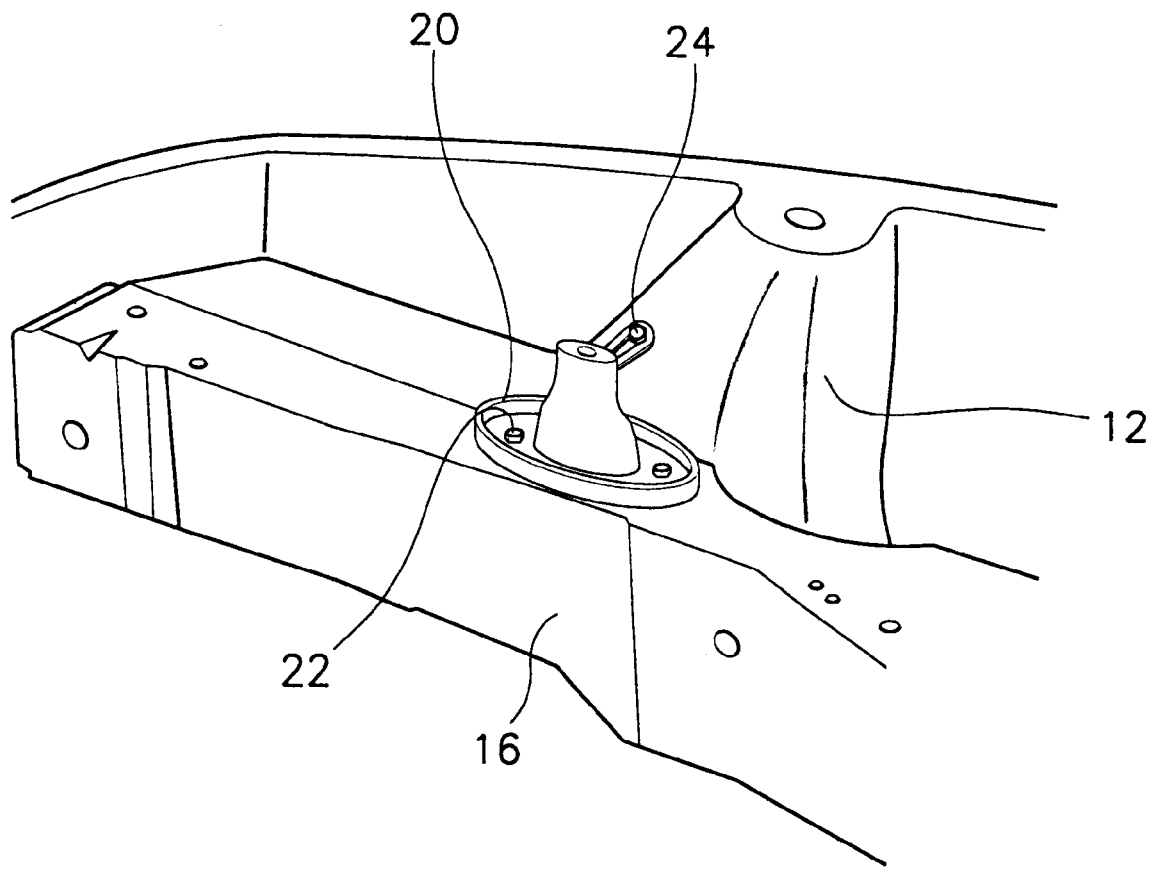
FIG. 1 is a perspective view of an engine mount using a conventional engine mounting apparatus.
Figure 2:
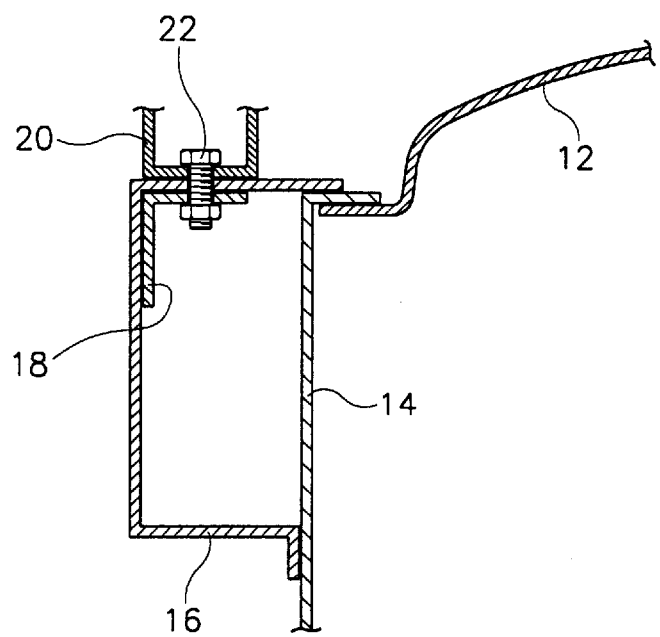
FIG. 2 is a sectional view of the conventional engine mounting apparatus.
Figure 3:
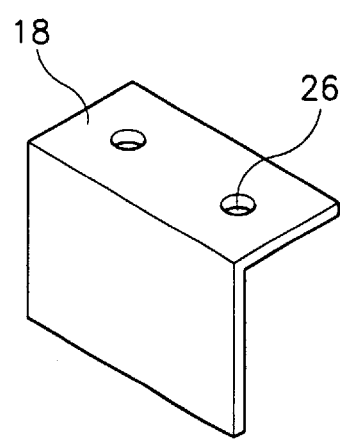
FIG. 3 is a perspective view of a reinforcing bracket included in the engine mounting apparatus of FIG. 2.
Figure 4:
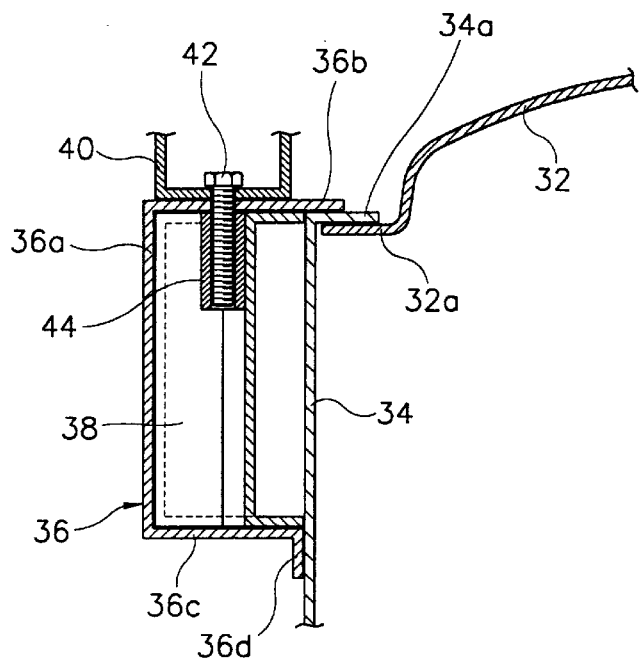
FIG. 4 is a sectional view of an engine mounting apparatus in accordance with the preferred embodiment of the present invention.
Figure 5:
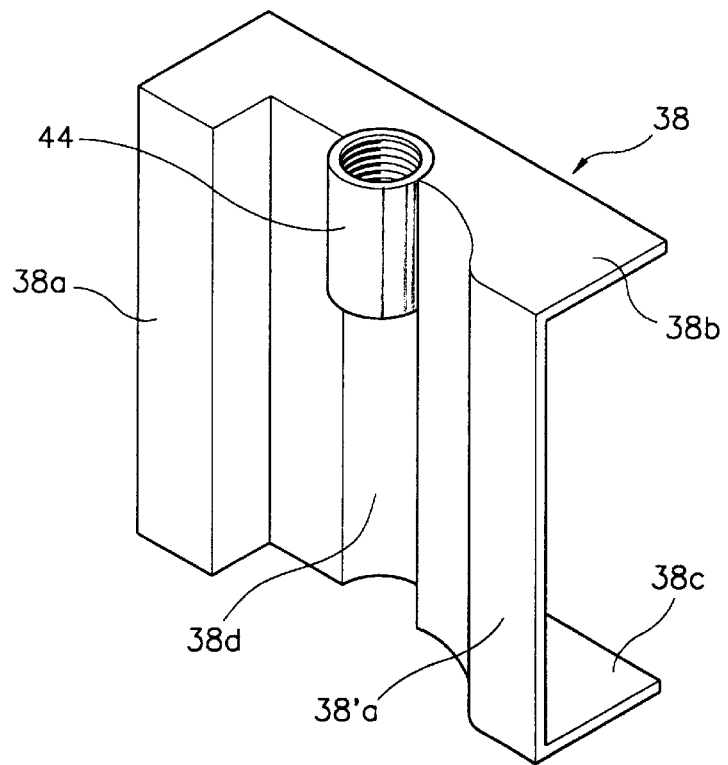
FIG. 5 is a perspective view, showing a pipe nut set in a reinforcing bracket of the engine mounting apparatus of this invention.

FIG. 4 is a sectional view of an engine mounting apparatus in accordance with the preferred embodiment of the present invention. FIG. 5 is a perspective view, showing a pipe nut set in a reinforcing bracket of the engine mounting apparatus of this invention. As shown in the drawings, the outer part 34 of a front side member is mounted to the inside edge of a fender apron front panel 32, while the inner part 36 of the front side member is mounted to the outer part 34.

A reinforcing bracket 38 is set within the inner part 36 of the front side member while being welded to the interior surface of the part 36. A pipe nut 44 is fixedly and vertically set in the reinforcing bracket 38 and engages with a locking bolt 42. This locking bolt 42 mounts the hydro-mounting cup 40 of an engine mount to the top surface of the inner part 36.

A horizontal flange 32a is formed along the inside edge of the fender apron front panel 32, while the top end of the outer part 34 of the front side member has a horizontal flange 34a. The outer part 34 is mounted to the fender apron front panel 32 by integrating the two horizontal flanges 32a and 34a into a single body. In such a case, the upper surface of the horizontal flange 32a of the fender apron front panel 32 closely meets the lower surface of the horizontal flange 34a of the outer part 34 prior to being welded together into a single body.

The inner part 36 of the front side member comprises a web 36a, with upper and lower horizontal flanges 36b and 36c formed at the upper and lower ends of the web 36a. A vertical flange 36d extends from the outside edge of the lower horizontal flange 36c. This vertical flange 36d is brought into close contact with the vertical surface of the outer part 34 of the front side member when mounting the inner part 36 to the outer part 34. In such a case, the outside edge portion of the upper horizontal flange 36b is welded to the upper surface of the outer member 34, while the vertical flange 36d is welded to the vertical surface of the outer part 34.

As best seen in FIG. 5, the reinforcing bracket 38 consists of two opposite vertical webs 38a and 38'a. These vertical webs 38a and 38'a are commonly welded to the interior surface of the web 36a of the inner part 36 while coming into close contact with the web 36a. The reinforcing bracket 38 also has upper and lower horizontal flanges 38b and 38c. These horizontal flanges 38b and 38c are welded to the interior surfaces of the upper and lower horizontal flanges 36b and 36c of the inner part 36 of the front side member while coming into close contact with the flanges 38b and 38c. The reinforcing bracket 38 is vertically concaved at a portion between the two vertical webs 38a and 38'a, thus forming a vertical concaved part 38d having a subcylindrical surface.

The pipe nut 44 is set in the upper end portion of the concaved part 38d through a welding process.

The above pipe nut 44 has an internally threaded cylindrical shape. This pipe nut 44 is so long enough that is completely receives the externally-threaded shank of the bolt 42.

In the engine mounting apparatus of this invention, the locking bolt 42, mounting the hydro-mounting cup 40 to the inner part 36 of the front side member, axially engages into and is held by the pipe nut 44. The vibration impact from the engine is thus applied to the sidewall of the pipe nut 44, and so the engine mounting apparatus is improved in its structural strength and in its vibration intercepting effect.

In addition, since the reinforcing bracket 38 is firmly set within the inner part 36 of the front side member while being brought into contact with the interior surface of the part 36 over a large area, with the pipe nut 44 being vertically set in the bracket 38, the structural strength and rigidity of the bracket 38 is improved.

As described above, the present invention provides an apparatus for mounting an engine for automobiles. In this apparatus, the vibration impact from the engine is applied to the sidewall of the pipe nut. The engine mounting apparatus of this invention is thus improved in its structural strength and in its vibration intercepting effect, and so it effectively reduces vibration noise of the engine during operation of the engine.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for mounting an engine of an automobile to an engine mount fixed to a top surface of an inner part of a front side member of the automobile, the apparatus comprising:

a reinforcing bracket set within said inner part of the front side member while being welded to an interior surface of said inner part wherein said reinforcing bracket is vertically concaved at a desired portion, thus forming a vertical concaved part having a subcylindrical surface; and a pipe nut set in said reinforcing bracket and engaging a locking bolt, said locking bolt mounting the engine mount to the top surface of said inner part of the front side member, wherein said pipe nut is set in said concaved part while being welded to the subcylindrical surface of the concaved part.

2. The apparatus according to claim 1, wherein said inner part of the front side member comprises a web, with upper and lower horizontal flanges formed at upper and lower ends of said web, wherein said reinforcing bracket comprises a web welded to an interior surface of said web of the inner part of the front side member, said reinforcing bracket also having upper and lower horizontal flanges welded to interior surfaces of said upper and lower horizontal flanges of the inner part of the front side member.

3. An apparatus for mounting an engine on an engine mount fixed to a front side member of an automobile, the apparatus comprising:

a reinforcing bracket fixed to an interior surface of said front side member wherein said reinforcing bracket comprises a concave portion; and a pipe nut fixed to the concave portion and engaging a locking bolt, said locking bolt mounting the engine mount to the top surface of said front side member.

4. The apparatus of claim 3 wherein the pipe nut is welded to the reinforcing bracket.

5. The apparatus of claim 3 wherein the reinforcing bracket is welded to the interior surface of the front side member.

6. The apparatus according to claim 3 wherein said inner part of the front side member comprises a web, wherein the reinforcing bracket comprises a web comprising a first flange and a second flange extending from opposite ends of the reinforcing bracket web, wherein the web of the front side member is fixed to the web of the reinforcing bracket.

7. The apparatus according to claim 6 wherein the front side member web comprises a first flange and a second flange extending from opposite ends of the front side member web, respectively, and wherein the reinforcing member web comprises a first flange and a second flange extending from opposite ends of the reinforcing bracket web, respectively, wherein the first flange extending from the front side member is fixed to the first flange extending from the reinforcing bracket and wherein the second flange extending from the front side member is fixed to the second flange extending from the reinforcing bracket.

8. The apparatus according claim 6 wherein the two webs are welded together, wherein the first flanges of the front side member and the reinforcing bracket are welded together, and wherein the second flanges of the front side member and the reinforcing bracket are welded together.

9. The apparatus of claim 8 wherein the pipe nut is welded to the reinforcing bracket.

* * * * *